H. J. HARDIE.
MOLD FOR TIRE FILLERS.
APPLICATION FILED MAR. 9, 1914.
1,139,276.
Patented May 11, 1915.
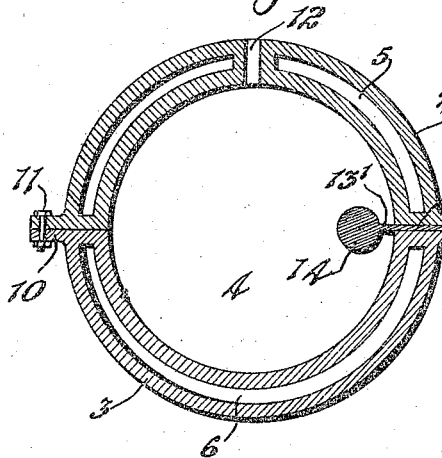
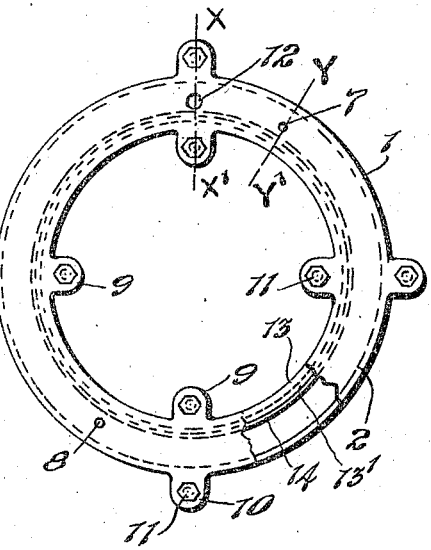
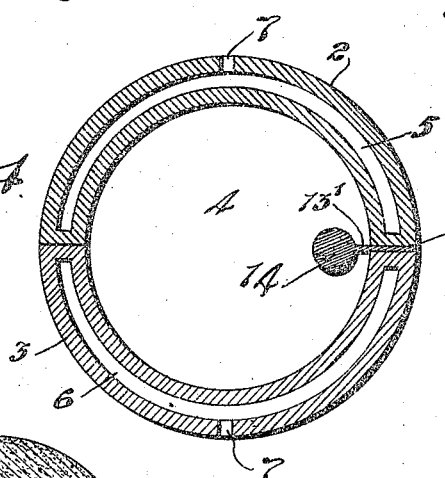
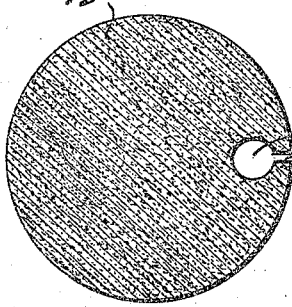
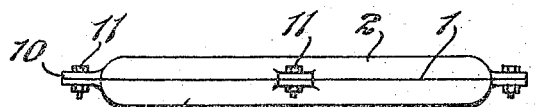
WITNESSES
INVENTOR
H. J. Hardie
By
Attorney.

UNITED STATES PATENT OFFICE.

HERBERT JAMES HARDIE, OF WINNIPEG, MANITOBA, CANADA.

MOLD FOR TIRE-FILLERS.

1,139,276.

Specification of Letters Patent. Patented May 11, 1915.

Application filed March 9, 1914. Serial No. 823,488.

*To all whom it may concern:*

Be it known that I, HERBERT JAMES HARDIE, of the city of Winnipeg, in the Province of Manitoba, Canada, have invented certain new and useful Improvements in Molds for Tire-Fillers, of which the following is the specification.

The invention relates to a mold especially designed for molding a resilient tire filler and the object of the invention is to provide an inexpensive, easily handled, efficient and durable mold whereby one can mold a tire filler in the form of a continuous ring having a continuous groove or channel therein inset in the inner side of the filler.

A further object of the invention is to provide a mold which can be readily cooled during the molding operation.

With the above objects in view the invention consists essentially in a mold formed from two complementary water-jacketed sections designed to be bolted together and forming a continuous molding chamber circular in cross section and a plate insertible between the mold sections and provided with an enlarged edge in the nature of a rim designed to extend into the molding chamber, the parts being arranged and constructed as hereinafter more particularly described and later pointed out in the appended claim.

Figure 1 is a plan view of the complete mold part being broken away to expose construction. Fig. 2 is a side view of the same. Fig. 3 is an enlarged detailed transverse sectional view through the mold, the section being taken in the plane denoted by the line X—X′ Fig. 1. Fig. 4 is an enlarged detailed transverse sectional view through the mold, the section being taken in the plane denoted by the line Y—Y′ Fig. 1. Fig. 5 is an enlarged detailed transverse sectional view through the filler molded by the mold.

In the drawing like characters of reference indicate corresponding parts in each figure.

1 represents the mold which is formed from two complementary sections 2 and 3, each section being more or less in the form of a continuous circular ring more or less semi-circular in cross section so that when the two sections are brought together a circular molding chamber 4 is formed. The sections are provided with water jackets 5 and 6 having suitable inlet and outlet openings 7 and 8. They are further supplied on the inner and outer edges with sets of extending lugs 9 and 10 arranged so that the two sections can be securely fastened together by releasable bolts 11 passing through the lugs.

12 is a filling opening located in the top section of the mold, this opening entering the chamber.

13 is a flat circular plate having the outer edge thereof enlarged to form a rim 14, the said rim being preferably circular in cross section. The body of the plate is designed to clamp in between the inner edges of the mold sections when the mold is set up, its position being best shown in Figs. 3 and 4 of the drawing. Upon examining these figures it will be noticed that the rim is actually set in the molding chamber, there being a portion 13′ of the plate body overhanging the inner edges of the mold sections.

In utilizing the mold for molding a resilient filler the mold is set up as shown in the drawings and the filler in the nature of a heavy liquid is poured into the mold through the filling opening 12. During the operation the mold can be cooled with running water admitted to the water jackets through the opening 7 and discharged from the same through the openings 8. When the filler has set the bolts are undone and the sections are removed from the filler. At this time the rim of the plate is still in the filler. It can be readily removed by springing back the containing edges of the resilient filler sufficiently far to allow of the complete withdrawal of the plate. The filler 15 so molded will be in the nature of a continuous ring having a circular cross section as shown in Fig. 5 of the drawing and provided on the inner side with an inset continuous groove or channel 16 approached from the inner side of the filler through a narrow slit 17. The groove is formed by the rim while the slit is formed by the overhanging portion 13′ of the plate body in the mold.

What I claim as my invention is:—

A mold for resilient tire fillers comprising releasably connected complementary sections providing between them a continuous circular molding chamber having a circular cross section of the dimensions of the filler to be molded, one of said sections being fitted with a filling opening from the exterior of the mold to the interior of the chamber and a thin continuous annular plate clamped between the sections and having the inner edge thereof inset in from the inner side of the mold wall and provided on the inset side with a continuous rim of circular cross section and relatively small in respect to the cross section of the mold, as and for the purpose specified.

Signed at Winnipeg, this 2nd day of January, 1913.

HERBERT JAMES HARDIE.

In the presence of—
G. S. ROXBURGH,
L. GOULD.